United States Patent
Liang et al.

(10) Patent No.: US 12,319,598 B2
(45) Date of Patent: Jun. 3, 2025

(54) FLOW ELECTRODE CAPACITIVE DEIONIZATION SYSTEM AND METHOD FOR RECOVERING PHOSPHORUS IN PHOSPHOGYPSUM LEACHATE AND SYNCHRONOUS PERFORMING BRINE DESALINATION

(71) Applicant: HUAZHONG UNIVERSITY OF SCIENCE AND TECHNOLOGY, Hubei (CN)

(72) Inventors: Sha Liang, Hubei (CN); Fan Yang, Hubei (CN); Jiakuan Yang, Hubei (CN); Xiao Guo, Hubei (CN); Shuai Chen, Hubei (CN); Shushan Yuan, Hubei (CN); Wenbo Yu, Hubei (CN); Jingping Hu, Hubei (CN); Huijie Hou, Hubei (CN); Liang Huang, Hubei (CN); Huabo Duan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/558,732

(22) PCT Filed: Dec. 21, 2022

(86) PCT No.: PCT/CN2022/140578
§ 371 (c)(1),
(2) Date: Nov. 2, 2023

(87) PCT Pub. No.: WO2024/103483
PCT Pub. Date: May 23, 2024

(65) Prior Publication Data
US 2025/0100911 A1    Mar. 27, 2025

(30) Foreign Application Priority Data
Nov. 18, 2022    (CN) .......................... 202211446254.7

(51) Int. Cl.
*C02F 1/469*    (2023.01)
*B01D 61/42*    (2006.01)
(Continued)

(52) U.S. Cl.
CPC ........ *C02F 1/4691* (2013.01); *B01D 61/4281* (2022.08); *C02F 2101/105* (2013.01);
(Continued)

(58) Field of Classification Search
CPC .............. C02F 1/4691; C02F 2101/105; C02F 2201/4618; C02F 1/46; C25B 9/40;
(Continued)

(56) References Cited

U.S. PATENT DOCUMENTS

| | | | |
|---|---|---|---|
| 11,261,109 B2 | 3/2022 | Wessling et al. | |
| 2009/0306451 A1 | 12/2009 | Cerea | |
| 2019/0106348 A1 | 4/2019 | Cote et al. | |

FOREIGN PATENT DOCUMENTS

| | | |
|---|---|---|
| CN | 104150681 | 11/2014 |
| CN | 106044970 | 10/2016 |

(Continued)

OTHER PUBLICATIONS

Jeon et al. "Novel Reuse Strategy in Flow-Electrode Capacitive Deionization with Switch Cycle Operation To Enhance Desalination Performance" Environ. Sci. Technol. Lett. 2019, 6, 739-744 and SI (Year: 2019).*

(Continued)

*Primary Examiner* — Luan V Van
*Assistant Examiner* — Alexander R. Parent
(74) *Attorney, Agent, or Firm* — JCIPRNET

(57) ABSTRACT

A flow electrode capacitive deionization system and a method for recovering phosphorus in phosphogypsum leachate and synchronous performing brine desalination belong to the technical field of wastewater treatment and
(Continued)

recycling. The flow electrode capacitive deionization system includes a phosphorus recovery electrodeionization module and a desalination electrodeionization module. A first flow electrode solution reservoir, a phosphorus recovery electrodeionization module cathode flow electrode chamber, and a desalination electrodeionization module anode flow electrode chamber are interconnected in a circulation. A second flow electrode solution reservoir, a phosphorus recovery electrodeionization module anode flow electrode chamber, and a desalination electrodeionization module cathode flow electrode chamber are interconnected in a circulation. Two independent flow electrode solution circulation loops are formed. The phosphogypsum leachate enters the phosphorus recovery electrodeionization module and phosphorus is enriched into a flow electrode solution. A phosphorus-rich solution is reacted with a ferrous solution under an oxygen-free condition to generate vivianite [$Fe_3(PO_4)_2 \cdot 8H_2O$].

10 Claims, 3 Drawing Sheets

(51) Int. Cl.
　　　*C02F 101/10*　　　(2006.01)
　　　*C25B 9/40*　　　(2021.01)
(52) U.S. Cl.
　　　CPC .. *C02F 2201/46* (2013.01); *C02F 2201/4618* (2013.01); *C25B 9/43* (2021.01)
(58) Field of Classification Search
　　　CPC ........ C25B 9/43; B01D 61/42; B01D 61/428; B01D 61/4281
　　　See application file for complete search history.

(56) References Cited

FOREIGN PATENT DOCUMENTS

| | | |
|---|---|---|
| CN | 109942112 | 6/2019 |
| CN | 110015822 | 7/2019 |
| CN | 111253005 | 6/2020 |
| CN | 112479320 | 3/2021 |
| CN | 113121035 | 7/2021 |
| CN | 113184952 | 7/2021 |
| CN | 109231684 | 9/2021 |
| CN | 114044699 | 2/2022 |
| CN | 115072921 | 9/2022 |
| EP | 2857442 | 4/2015 |
| WO | WO-2019109139 A1 * | 6/2019 ............ C02F 1/4691 |

OTHER PUBLICATIONS

Chang et al. "Superiority of a novel flow-electrode capacitive deionization (FCDI) based on a battery material at high applied voltage " Desalination 468 (2019) 114080 (Year: 2019).*
Zhang et al. "Phosphate selective recovery by magnetic iron oxide impregnated carbon flow-electrode capacitive deionization (FCDI )" Water Research 189 (2021) 116653 (Year: 2021).*
Yunfei He et al., "Highly efficient and selective extraction of phosphorous from wastewater as vivianite in a strategically operated four-chamber flow electrode capacitive deionization", Desalination, Sep. 25, 2022, pp. 1-10, vol. 544, No. 116089.
Yanhong Bian et al., "pH Dependence of Phosphorus Speciation and Transport in Flow-Electrode Capacitive Deionization", Environ. Sci. Technol., Jun. 25, 2020, pp. 9116-9123, vol. 54.
Jing Zhang et al., "Removal and recovery of phosphorus from low-strength wastewaters by flow-electrode capacitive deionization", Separation and Purification Technology, Nov. 17, 2019, pp. 1-8, vol. 237, No. 116322.
Longqian Xu et al., "Selective recovery of phosphorus and urea from fresh human urine using a liquid membrane chamber integrated flow-electrode electrochemical system", Water Research, Jul. 12, 2021, pp. 1-10, vol. 202, No. 117423.
Longqian Xu et al., "Selective Recovery of Phosphorus from Synthetic Urine Using Flow-Electrode Capacitive Deionization (FCDI)-Based Technology", ACS EST Water, Sep. 29, 2020, pp. 175-184, vol. 1.
"International Search Report (Form PCT/ISA/210) of PCT/CN2022/140578", mailed on Jul. 19, 2023, pp. 1-4.
"Written Opinion of the International Searching Authority (Form PCT/ISA/237) of PCT/CN2022/140578", mailed on Jul. 19, 2023, pp. 1-4.

* cited by examiner

FLOW ELECTRODE CAPACITIVE DEIONIZATION SYSTEM AND METHOD FOR RECOVERING PHOSPHORUS IN PHOSPHOGYPSUM LEACHATE AND SYNCHRONOUS PERFORMING BRINE DESALINATION

CROSS-REFERENCE TO RELATED APPLICATION

This application is a 371 application of International PCT application serial no. PCT/CN2022/140578 filed on Dec. 21, 2022, which claims the priority benefit of China application no. 202211446254.7 filed on Nov. 18, 2022. The entirety of each of the above mentioned patent applications is hereby incorporated by reference herein and made a part of this specification.

TECHNICAL FIELD

The disclosure belongs to the technical field of wastewater treatment and recycling and relates to a flow electrode capacitive deionization system and method for recovering phosphorus in phosphogypsum leachate and synchronous performing brine desalination.

DESCRIPTION OF RELATED ART

Phosphogypsum is a by-product of the production process of wet-process phosphoric acid, is a kind of off-white or gray-black powdery particles, and is mainly composed of calcium sulfate dihydrate ($CaSO_4 \cdot 2H_2O$). The moisture content of phosphogypsum is 10% to 30%, and phosphogypsum contains residual phosphoric acid, sulfuric acid, hydrofluoric acid, aluminum, calcium, cadmium, arsenic, and other components. About 5 tons of phosphogypsum are produced per ton of phosphoric acid product (calculated as $P_2O_5$). According to statistics, the accumulated storage of phosphogypsum has reached 600 million tons, and the annual discharge exceeds 80 million tons in China. Regarding the ways and products of comprehensive use of phosphogypsum, due to the influence of various factors, the comprehensive use rate of phosphogypsum is not high, and it is impossible to fully use phosphogypsum in the short term. At present, wet slag is still used for storage in most phosphogypsum stacks.

Due to the high degree of compaction of phosphogypsum stacks and the influence of wet storage and other factors, in phosphogypsum stacks, it is impossible to adopt a bottom diversion method similar to domestic waste landfills to drain all leachate. In a phosphogypsum stacks, the drainage of leachate is generally carried out on each platform of the stacking yard, and the leachate is collected and reused in combination with the chute-tunnel backwater or siphon methods. The composition of the phosphogypsum leachate is complex. The total phosphorus concentration in the leachate is as high as 4000 mg/L to 8000 mg/L, the fluoride concentration is 400 mg/L to 1000 mg/L, the ammonia nitrogen concentration is 300 mg/L to 600 mg/L, and the pH=1.5 to 4.5. It is an acidic wastewater with high phosphorus, high fluorine, and medium nitrogen. Many phosphogypsum stacks are distributed along rivers, so if standardized stockpiling and timely recycling cannot be achieved, it is easy to cause the total phosphorus content of the surrounding water body and groundwater to exceed the quality standard and eutrophication. Due to the lack of a better treatment method, most enterprises collect the phosphogypsum leachate and reuse it in the phosphoric acid production process. For instance, in the invention patent "Reuse processing device and method of phosphogypsum leachate" (application publication number CN109942112A), the methods of coagulation pretreatment, ultrafiltration, and secondary reverse osmosis are used to concentrate the phosphorus and fluorine resources in the leachate and then recycle them. However, this method may lead to the continuous enrichment of fluorine and heavy metals, so it is not conducive to the production of phosphoric acid. In recent years, with the in-depth promotion of the Yangtze River Coordinated Protection Strategy, a large number of phosphogypsum stacks are facing closed-site renovation, and the original recycling treatment is difficult to meet the requirements of environmental protection supervision. Therefore, phosphogypsum leachate treatment and up-to-standard discharge are critical issues.

At present, the main methods for the treatment of phosphogypsum leachate include chemical precipitation, membrane separation, and biological methods. Among these methods, the combined process based on the chemical precipitation method is widely used in the industry. For instance, in the invention patent "Treatment method and system for purifying phosphogypsum leachate" (authorized publication number CN109231684B), basic agents such as lime are used to adjust the pH in two steps to precipitate phosphorus in the phosphogypsum leachate, and polyacrylamide is added to decrease the amounts of suspended solids. Ammonia removal membrane and nitrification and denitrification unit are then used to remove ammonia nitrogen. However, this method consumes a large amount of lime, the addition of polyacrylamide may increase the processing costs, and the membrane filtration process also has the disadvantages of easy clogging and high operation and maintenance costs. In the invention patent "Treatment device and method for resource recovery of phosphogypsum leachate" (application publication number CN113121035A), reagents such as lime and sodium hydroxide are used to adjust the phosphogypsum leachate to a specific pH value in multiple steps to achieve selective precipitation of phosphorus, fluorine, ammonia nitrogen, and other resources. However, the pH adjustment range of this method is 3 to 12, and this process requires the addition of a large amounts of alkaline reagents. Further, in order to make the effluent meet the discharge standard, it is necessary to add concentrated sulfuric acid to achieve neutralization. A large amount of acid and alkali reagents are consumed, which increases the operating costs of the entire process. In addition, the purity of the precipitation product obtained by this method is not high, and the recovery efficiency of resources such as phosphorus and fluorine is low, so the economic value is limited. The US patent "Process for the recovery of phosphate from phosphate rock" (Patent No. US2019/0106348A1) proposes a method for treating phosphorus-containing wastewater such as phosphogypsum leachate and recovering phosphorus. By adding basic reagents such as lime and sodium hydroxide to the phosphogypsum leachate, the pH is adjusted, and fluoride and silicon dioxide are precipitated and removed in sequence. The pH of the supernatant is further adjusted, and magnesium sources and ammonium salts are added to generate magnesium ammonium phosphate [$MgNH_4PO_4 \cdot 6H_2O$] precipitation to recover phosphorus. Subsequent advanced treatment processes such as membrane separation and breakpoint chlorination are used to achieve wastewater discharge standards. In this method, although recovered products can be obtained, phosphorus and fluorine are easily precipitated simultaneously during the pH adjustment process, resulting in low product purity and limited overall recovery of phosphorus.

Flow electrode capacitive deionization (FCDI) is a desalination technology based on the principle of supercapacitors, and it has received extensive attention in recent years. In the invention patent "Device for synchronously recovering nitrogen and phosphorus in wastewater as well as a recovery method and application thereof" (application publication number CN113184952A), a nitrogen recovery chamber and a phosphorus recovery chamber are added to the traditional flow electrode capacitive deionization device. The positively charged nitrogen and negatively charged phosphorus in the wastewater enter the nitrogen recovery chamber and phosphorus recovery chamber respectively through the cation and anion ion exchange membranes under the action of the electric field and are finally recovered in the form of concentrated ammonia and phosphoric acid. However, during this operation, sodium hydroxide and hydrochloric acid need to be added to the nitrogen and phosphorus recovery chamber to balance the charge migration, which will not only affect the product purity, but also generate a large amount of high salinity wastewater. The US patent "Single module, flow-electrode apparatus and method for continuous water desalination and ion separation by capacitive deionization" (Patent No. 11261109B2) proposes a single-module flow electrode capacitive deionization system. In the system, a set of ion exchange membranes is added in a traditional flow electrode capacitive deionization device which is based on the three-chamber structure of "electrode chamber-desalination chamber-electrode chamber", and the four-chamber structure of "electrode chamber-desalination chamber-concentrating chamber-electrode chamber" is obtained. Continuous desalination of brine and selective removal of ions may be achieved in this way. However, this structure leads to a significant increase in the distance between the two electrodes, and the energy consumption level of the device will increase. Further, relying only on the selective effect of specific ion exchange membranes, it will be difficult to meet the separation and treatment requirements of high-concentration and complex wastewater.

In view of the above, in the currently-available phosphogypsum leachate treatment methods, there are problems such as large dosage of chemical agents, high treatment costs, large amounts of waste residue, and low phosphorus recovery efficiency. The flow electrode capacitive deionization technology has high application potential in the field of resource recovery. However, the existing related research and applications are limited to the treatment of low-concentration wastewater. Aiming at the complex composition of phosphogypsum leachate, it is of great application value and environmental protection benefit to develop a low-cost, low-energy-consumption, and stable performance-based method for efficiently recovering phosphorus in the phosphogypsum leachate based on a flow electrode capacitive deionization system.

SUMMARY

In response to the above defects or the needs for improvement in the related art, the disclosure aims to provide a flow electrode capacitive deionization system and method for recovering phosphorus in phosphogypsum leachate and synchronous performing brine desalination, and through the design of the flow electrode capacitive deionization system and operation method, problems such as large dosage of chemical agents, high treatment costs, large amounts of waste residue, and low phosphorus recovery efficiency found in the phosphogypsum leachate treatment methods provided by the related art are effectively solved. The selective separation of phosphorus in the phosphogypsum leachate and the rapid desalination of brine are simultaneously and efficiently achieved in the disclosure. The use of chemical reagents such as acid and alkali reagents is thereby significantly reduced, the recycling costs are lowered, the generation of waste residues is decreased, and the energy consumption is low. Further, more than 97% of the phosphate in the phosphogypsum leachate is removed and converted into high-purity vivianite [$Fe_3(PO_4)_2 \cdot 8H_2O$] products. The phosphorus recovery efficiency exceeds that in the related art, and significant economic and environmental benefits are thus provided.

According to the first aspect of the disclosure, the disclosure provides a flow electrode capacitive deionization system for recovering phosphorus in phosphogypsum leachate and synchronous performing brine desalination. The flow electrode capacitive deionization system includes a phosphorus recovery electrodeionization module and a desalination electrodeionization module.

The phosphorus recovery electrodeionization module includes a phosphorus recovery electrodeionization module anode flow electrode chamber, a phosphorus recovery electrodeionization module cathode flow electrode chamber, and a phosphorus recovery electrodeionization module deionization chamber. A first anion exchange membrane is provided between the phosphorus recovery electrodeionization module anode flow electrode chamber and the phosphorus recovery electrodeionization module deionization chamber. A first cation exchange membrane is provided between the phosphorus recovery electrodeionization module cathode flow electrode chamber and the phosphorus recovery electrodeionization module deionization chamber.

The desalination electrodeionization module includes a desalination electrodeionization module anode flow electrode chamber, a desalination electrodeionization module cathode flow electrode chamber, and a desalination electrodeionization module deionization chamber. A second cation exchange membrane is provided between the desalination electrodeionization module cathode flow electrode chamber and the desalination electrodeionization module deionization chamber. A second anion exchange membrane is provided between the desalination electrodeionization module anode flow electrode chamber and the desalination electrodeionization module deionization chamber.

The flow electrode capacitive deionization system further includes a phosphogypsum leachate reservoir, a brine reservoir, a first flow electrode solution reservoir, and a second flow electrode solution reservoir.

A phogypsum leachate reservoir communicates with a liquid inlet of the phosphorus recovery electrodeionization module deionization chamber. A liquid outlet of the phosphorus recovery electrodeionization module deionization chamber communicates with a liquid inlet of the phosphogypsum leachate reservoir. A liquid outlet of the brine reservoir communicates with a liquid inlet of the desalination electrodeionization module deionization chamber.

A liquid outlet of the first flow electrode solution reservoir communicates with a liquid inlet of the phosphorus recovery electrodeionization module anode flow electrode chamber. A liquid outlet of the phosphorus recovery electrodeionization module anode flow electrode chamber communicates with a liquid inlet of the desalination electrodeionization module cathode flow electrode chamber. A liquid outlet of the desalination electrodeionization module cathode flow electrode chamber communicates with a liquid inlet of the first flow electrode solution reservoir.

A liquid outlet of the second flow electrode solution reservoir communicates with a liquid inlet of the phosphorus recovery electrodeionization module cathode flow electrode chamber. A liquid outlet of the phosphorus recovery electrodeionization module cathode flow electrode chamber communicates with a liquid inlet of the desalination electrodeionization module anode flow electrode chamber. A liquid outlet of the desalination electrodeionization module anode flow electrode chamber communicates with a liquid inlet of the second flow electrode solution reservoir.

Each of the phosphorus recovery electrodeionization module anode flow electrode chamber, the phosphorus recovery electrodeionization module cathode flow electrode chamber, the desalination electrodeionization module anode flow electrode chamber, and the desalination electrodeionization module cathode flow electrode chamber includes a current collector plate having a flow electrode solution flowing channel.

Preferably, a liquid outlet of the desalination electrodeionization module deionization chamber communicates with a liquid inlet of the brine reservoir.

According to another aspect of the disclosure, the disclosure further provides a method for recovering phosphorus in phosphogypsum leachate and synchronous performing brine desalination based on the flow electrode capacitive deionization system. The method includes the following steps.

In S1, a phosphogypsum leachate and a brine are respectively transported from the phosphogypsum leachate reservoir and the brine reservoir to the phosphorus recovery electrodeionization module deionization chamber and the desalination electrodeionization module deionization chamber in the flow electrode capacitive deionization system through a liquid pump. A flow electrode solution is transported to two independent flow electrode solution circulation loops through the liquid pump. One of the two independent flow electrode solution circulation loops is: from the first flow electrode solution reservoir to the phosphorus recovery electrodeionization module anode flow electrode chamber, then to the desalination electrodeionization module cathode flow electrode chamber, and finally back to the first flow electrode solution reservoir. The other one of the two independent flow electrode solution circulation loops is: from the second flow electrode solution reservoir to the phosphorus recovery electrodeionization module cathode flow electrode chamber, then to the desalination electrodeionization module anode flow electrode chamber, and finally back to the second flow electrode solution reservoir.

The liquid inflow mode of the phosphogypsum leachate is batch-mode. The batch-mode is that the phosphogypsum leachate is transported from the phosphogypsum leachate reservoir to the phosphorus recovery electrodeionization module deionization chamber through the liquid pump and returns to the phosphogypsum leachate reservoir after deionization treatment. The phosphogypsum leachate enters the phosphorus recovery electrodeionization module. The phosphate migrates to the phosphorus recovery electrodeionization module anode flow electrode chamber, and follows the flow electrode to the desalination electrodeionization module cathode flow electrode chamber, and is desorbed and enriched into the flow electrode solution by a reverse voltage.

The liquid inflow mode of the brine is single-pass. The single-pass is that the brine is transported from the brine reservoir to the desalination electrodeionization module deionization chamber through the liquid pump and is transported out of the flow electrode capacitive deionization system after deionization treatment.

In S2: operating the phosphorus recovery electrodeionization module and the desalination electrodeionization module at a same current, and an inflow velocity of phosphogypsum leachate, an inflow velocity of brine, and a circulation velocity of the flow electrode solution are controlled.

In S3, a purified phosphorus-rich solution is obtained from the first flow electrode solution reservoir.

Preferably, in step S1, the phosphogypsum leachate is a purified solution after filtration or sedimentation, where a total suspended solids does not exceed 0.5 mg/L, a total content of calcium element and magnesium element does not exceed 2000 mg/L, a content of aluminum element does not exceed 600 mg/L, a content of fluorine element does not exceed 1500 mg/L, and a content of phosphorus element does not exceed 6000 mg/L in the phosphogypsum leachate.

Preferably, in step S1, the brine is a softened solution, a salt content of the brine does not exceed 10 g/L, a total hardness does not exceed 3 mg/L, the total hardness is calculated as $CaCO_3$, and a total suspended solids does not exceed 0.5 mg/L.

Preferably, in step S1, the flow electrode solution contains a conductive agent, an electrolyte, and a solvent, where a content of the conductive agent is 5 wt % to 10 wt %, and a concentration of the electrolyte in the flow electrode solution is 0 g/L to 2 g/L.

Preferably, the conductive agent in the flow electrode solution is one or more of activated carbon, conductive carbon black, and carbon nanotubes. The electrolyte in the flow electrode solution is one or more of sodium chloride, sodium sulfate, potassium chloride, and potassium sulfate. The solvent in the flow electrode solution is water.

Preferably, in step S1, a working current density of the phosphorus recovery electrodeionization module and the desalination electrodeionization module is 10 $A/m^2$ to 30 $A/m^2$.

Preferably, in step S1, an inflow velocity of the phosphogypsum leachate is 5 mL/min to 20 mL/min, a total circulation volume is 10 times to 30 times of a treatment volume in the phosphogypsum leachate reservoir, and an inflow velocity of the brine is 5 mL/min to 20 mL/min.

Preferably, in step S1, the circulation velocity of the flow electrode solution is 10 mL/min to 20 mL/min. Flow electrode solution volumes in the first flow electrode solution reservoir and the second flow electrode solution reservoir are 0.5 times to 2 times of a treatment volume in the phosphogypsum leachate reservoir.

Preferably, the purified phosphorus-rich solution is reacted with a ferrous solution under an oxygen-free condition to generate vivianite [$Fe_3(PO_4)_2 \cdot 8H_2O$], so phosphorus recovery is achieved.

Preferably, a mole ratio of the iron element in the ferrous solution to the phosphorus element in the phosphorus-rich solution is 1.5 to 1.65.

Preferably, during the reaction, a reaction pH is maintained at 6 to 7.5.

Preferably, the ferrous solution is ferrous chloride or ferrous sulfate. In general, the above technical solutions provided by the disclosure have the following technical advantages compared to the related art.

(1) By adopting the flow electrode capacitive deionization system and the corresponding operation method, the selective separation of phosphorus in the phosphogypsum leachate and the rapid desalination of brine are simultaneously and efficiently achieved in the disclosure. The addition of chemical reagents such as acid and alkali reagents is thereby significantly reduced, the recycling costs are lowered, the generation of waste residues is decreased, and the energy consumption is low. Further, more than 97% of the phosphate in the phosphogypsum leachate is removed and converted into high-purity vivianite products. The disclosure has important significance for achieving resourceful treatment of phosphogypsum leachate in an environment-friendly and efficient manner.

(2) The disclosure first provides a flow electrode capacitive deionization system and method for recovering phosphorus in phosphogypsum leachate and synchronous performing brine desalination. By optimizing and integrating the phosphorus recovery electrodeionization module and the desalination electrodeionization module, a flow electrode capacitive deionization system is obtained. Through the design of the flow electrode capacitive deionization system and operation method, the efficient recovery of phosphorus in the phosphogypsum leachate and the rapid desalination of brine are achieved. Further, as a wastewater treatment technology with low energy consumption, the flow electrode capacitive deionization system and method have good application prospects in the treatment of phosphogypsum leachate.

(3) In the disclosure, by controlling the reverse voltage between the phosphorus recovery electrodeionization module and the desalination electrodeionization module, the in-situ regeneration of the adsorption capacity of the electrode material is implemented. Compared to the conventional operation mode in single-module flow electrode capacitive deionization system, under the same energy consumption, the phosphorus separation and desalination rates are significantly improved.

(4) In the disclosure, through cooperative control of the operating parameters of the phosphorus recovery electrodeionization module and desalination electrodeionization module in the flow electrode capacitive deionization system, the high-concentration phosphorus-rich solution with neutral pH level is obtained by using the charge compensation effect of anions and cations in the deionization process of the two modules. The composition of the solution is beneficial to the subsequent synthesis of high-purity vivianite products, and at the same time, the scaling of calcium, magnesium, and other metal elements is prevented in the flow electrode chamber under an alkaline environment.

(5) By combining the flow electrode capacitive deionization system and the vivianite crystallization process, the transformation of phosphorus in the phosphogypsum leachate to high-purity and high-value products is achieved in the disclosure. Further, the consumption of chemical reagents such as acid and alkali reagents and the generation of waste residues are significantly reduced in the disclosure, and it has the characteristics of low recycling costs, low energy consumption, and high value of recycled products.

DESCRIPTION OF THE EMBODIMENTS

Figure 1:
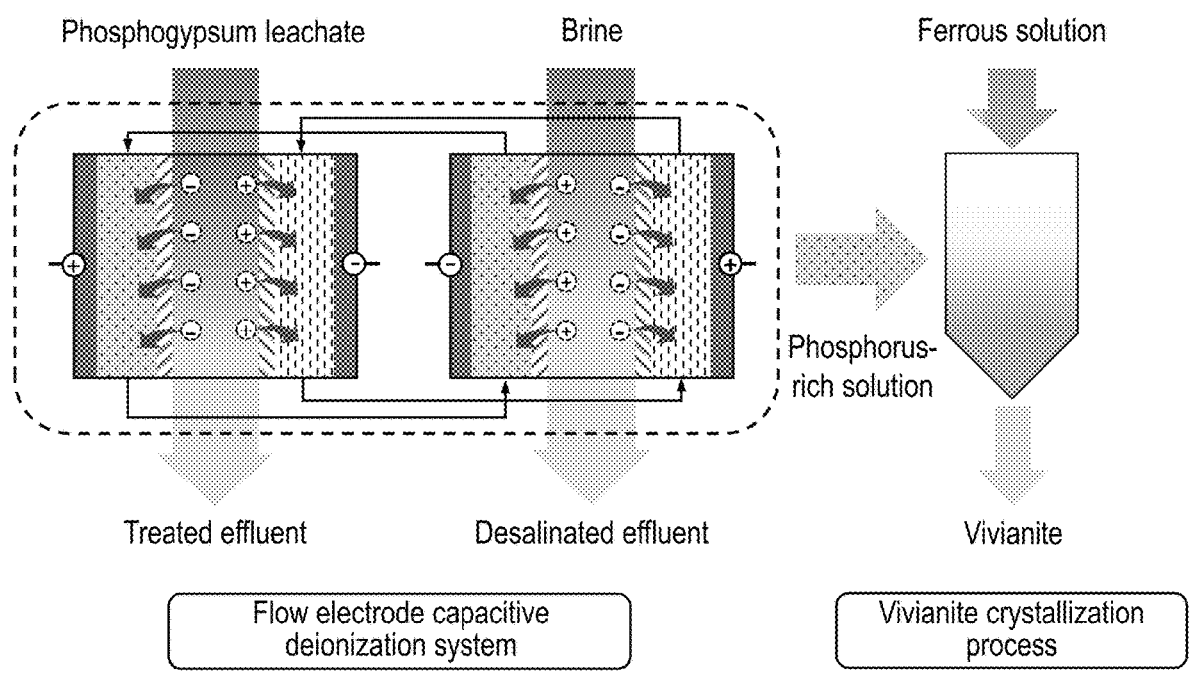
FIG. 1 is a flow chart of a process of recovering phosphorus in phosphogypsum leachate and synchronous performing brine desalination based on a flow electrode capacitive deionization system according to the disclosure.

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention. In addition, the technical features involved in the various embodiments of the invention described below can be combined with each other as long as the technical features do not conflict with each other.

In view of the detects of the related art, the disclosure provides a flow electrode capacitive deionization system and method for recovering phosphorus in phosphogypsum leachate and synchronous performing brine desalination. By optimizing and integrating the phosphorus recovery electrodeionization module and the desalination electrodeionization module, a flow electrode capacitive deionization system that can simultaneously achieve efficient and selective separation of phosphorus in phosphogypsum leachate and rapid desalination of brine is obtained. Further, the high-value recovery of phosphorus resources is achieved through the subsequent vivianite crystallization process.

To be specific, the principle of the method of the disclosure is provided as follows: Phosphogypsum leachate contains a large number of anions and cations. The anions include $F^-$, $Cl^-$, $SO_4^{2-}$, $H_2PO_4^-$, $HPO_4^{2-}$, etc., and the cations include $Na^+$, $K^+$, $NH_4^+$, $Ca^{2+}$, $Mg^{2+}$, $Al^{3+}$, etc. By adding alkaline reagents to adjust the pH of the solution, the step-by-step precipitation of different elements may be implemented. However, the fluorine and phosphate, with high content, are easy to form various precipitation products, such as $CaF_2$ and $Ca(H_2PO_4)_2$, with metal elements such as calcium and magnesium in a wide pH range, so that the purity of the final phosphorus recovery products is low. Therefore, in order to achieve efficient recovery of phosphorus resources, it is necessary to effectively separate phosphate from metal elements such as calcium and magnesium. The flow electrode capacitive deionization technology has the characteristics of efficient selective separation.

A flow electrode capacitive deionization system includes a phosphorus recovery electrodeionization module, a desalination electrodeionization module, a phosphogypsum leachate reservoir, a brine reservoir, and two flow electrode solution reservoirs. Herein, a first flow electrode solution reservoir, a phosphorus recovery electrodeionization module cathode flow electrode chamber, and a desalination electrodeionization module anode flow electrode chamber are interconnected in a circulation. A second flow electrode solution reservoir, a phosphorus recovery electrodeionization module anode flow electrode chamber, and a desalination electrodeionization module cathode flow electrode chamber are interconnected in a circulation. Two independent flow electrode solution circulation loops are formed. The liquid inflow mode adopted by the phosphorus recovery electrodeionization module is batch-mode, and the liquid inflow mode adopted by the desalination electrodeionization module is single-pass.

The phosphogypsum leachate enters the phosphorus recovery electrodeionization module. The phosphate migrates to the phosphorus recovery electrodeionization module anode flow electrode chamber, and follows the flow electrode solution to the desalination electrodeionization module cathode flow electrode chamber, and is desorbed and enriched into a flow electrode solution by a reverse voltage. The phosphorus-rich solution separated from the flow electrode solution is passed into a vivianite crystallization reactor, and finally a high-purity vivianite product is obtained.

After a certain voltage is exerted to current collector plates 2 at both ends of a flow electrode capacitive deionization device, flow carbon electrodes are charged positively or negatively by direct and indirect contact with the current collector plates 2 in flow electrode chambers (a phosphorus recovery electrodeionization module anode flow electrode chamber 3, a desalination electrodeionization module anode flow electrode chamber 15, a phosphorus recovery electrodeionization module cathode flow electrode chamber 7, and a desalination electrodeionization module cathode flow electrode chamber 11). After the phosphogypsum leachate enters a phosphorus recovery electrodeionization module deionization chamber 5, under the action of the electric field, anions such as phosphate ($H_2PO_4^-$, $HPO_4^{2-}$, and $PO_4^{3-}$) in the solution migrate through a first anion exchange membrane 4 to the phosphorus recovery electrodeionization module anode flow electrode chamber 3 and are adsorbed into electric double layers on a surface of the flow carbon electrode under the electrostatic attraction. At the same time, the removal of $Ca^{2+}$, $Mg^{2+}$, $NH_4^+$, and other cations occurs on the other side of a phosphorus removal electrodeionization module. The flow electrode solution enters the desalination electrodeionization module cathode flow electrode chamber 11 along the circulation loop. Since the voltage is reversed from the previous module, the inherent charge of the flow carbon electrode also changes from positive to negative. Under the electrostatic repulsion, anions such as phosphate adsorbed on the surface are desorbed and released into the flow electrode solution. On the one hand, the cations (such as $Na^+$), in the brine in the desalination electrodeionization module deionization chamber 13, enter the desalination electrodeionization module cathode flow electrode chamber 11 across a cation exchange membrane under the action of an electric field and are adsorbed into the electric double layers of the negatively charged flow carbon electrode. On the other hand, the anions desorbed from the surface of the flow carbon electrode further causes the potential imbalance of the desalination electrodeionization module cathode flow electrode chamber 11, so that the electromigration transport of cations in the deionization chamber 13 is enhanced. After the flow electrode adsorbed with cations returns to the phosphorus recovery electrodeionization module anode flow electrode chamber 3, the abovementioned similar process may also occur. Therefore, the deionization rate and energy efficiency of the phosphorus recovery electrodeionization module and the desalination electrodeionization module are significantly improved compared with a single-module flow electrode capacitive deionization system. After the operation, the first flow electrode solution reservoir 9 contains anions such as phosphate and P from the phosphorus recovery electrodeionization module and cations such as $Na^+$ from the desalination electrodeionization module. The second flow electrode solution reservoir 10 contains cations such as $NH_4^+$, $Ca^{2+}$, and $Mg^{2+}$ from the phosphorus recovery electrodeionization module and anions such as $Cl^-$ from the desalination electrodeionization module. By adjusting the operating current, the charges of different ions from the phosphorus recovery electrodeionization module and the desalination electrodeionization module may be made to be equivalent, and the pH of the flow electrode solution may be maintained in a neutral range. The phenomenon of over-acid and over-alkali is thereby prevented from occurring, which is beneficial to the subsequent recovery of phosphorus and may also reduce the degree of scaling. After the phosphogypsum leachate is treated to a certain extent, phosphorus-rich solution with neutral pH is obtained from the first flow electrode solution reservoir 9 by filtration operation. After adding ferrous iron into the solution, high-purity vivianite [$Fe_3(PO_4)_2 \cdot 8H_2O$] may be produced through the reaction shown in formula (1) (where n may be 1, 2, and 3).

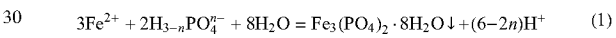
$$3Fe^{2+} + 2H_{3-n}PO_4^{n-} + 8H_2O = Fe_3(PO_4)_2 \cdot 8H_2O\downarrow + (6-2n)H^+ \qquad (1)$$

Anions such as $F^-$ and $SO_4^{2-}$ are retained in the solution because they cannot precipitate with $Fe^{2+}$. The high purity of the product is thus ensured, and resources such as fluorine in the solution and ammonia nitrogen in the second flow electrode solution reservoir 10 may be recovered later.

The results show that more than 97% of the phosphorus in the phosphogypsum leachate may be removed and converted into high-purity vivianite products after the above process. The recovery efficiency and product purity of phosphorus significantly exceed the currently-available treatment technology, and the product has high application value. At the same time, compared to a conventional single-module flow electrode capacitive deionization system, the desalination electrodeionization module has a significantly higher desalination rate under the same energy consumption.

Specific examples are provided as follows.

Example 1

Figure 2:
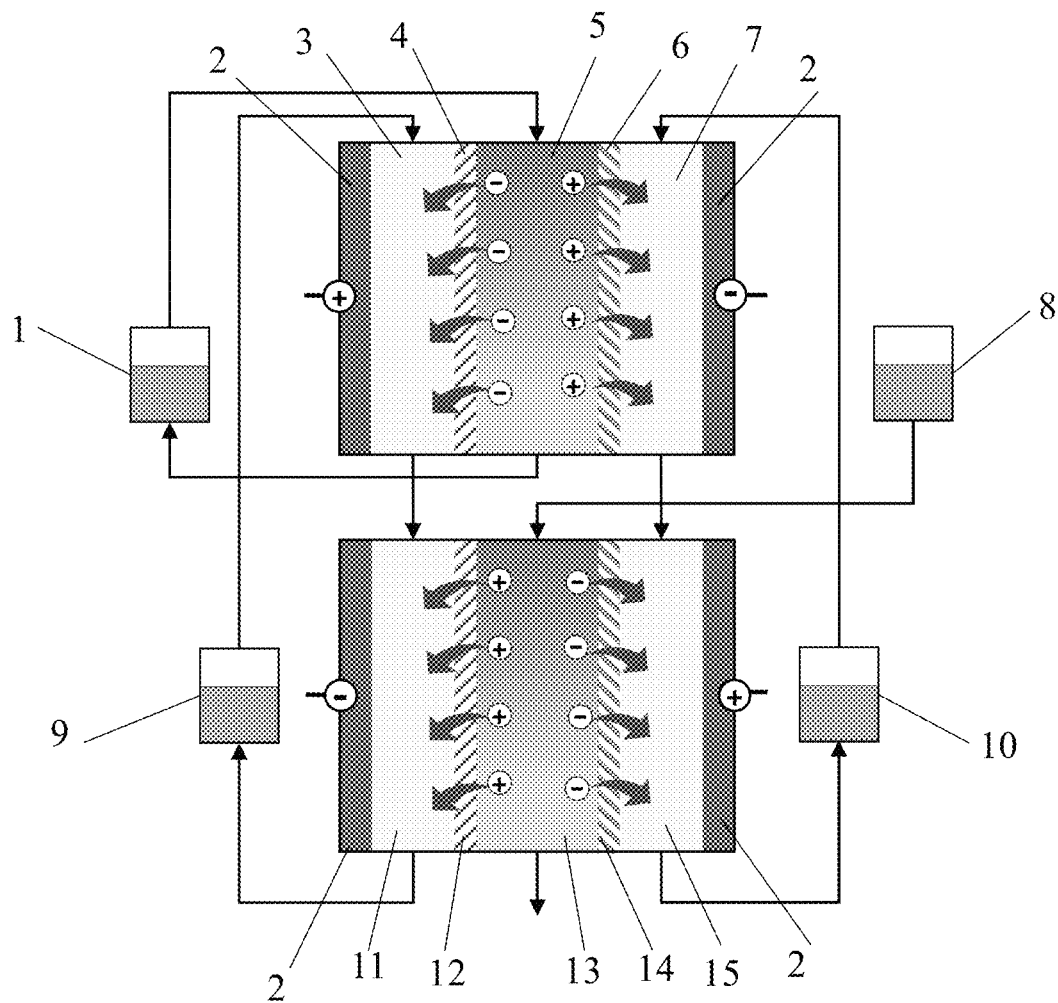
FIG. 2 is a schematic view of the flow electrode capacitive deionization system of FIG. 1 provided by Example 1 of the disclosure, where 1: phosphogypsum leachate reservoir, 2: current collector plate, 3: phosphorus recovery electrodeionization module anode flow electrode chamber, 4: first anion exchange membrane, 5: phosphorus recovery electrodeionization module deionization chamber, 6: first cation exchange membrane, 7: phosphorus recovery electrodeionization module cathode flow electrode chamber, 8: brine reservoir, 9: first flow electrode solution reservoir, 10: second flow electrode solution reservoir, 11: desalination electrodeionization module cathode flow electrode chamber, 12: second cation exchange membrane, 13: desalination electrodeionization module deionization chamber, 14: second anion exchange membrane, and 15: desalination electrodeionization module anode flow electrode chamber.
Figure 3:
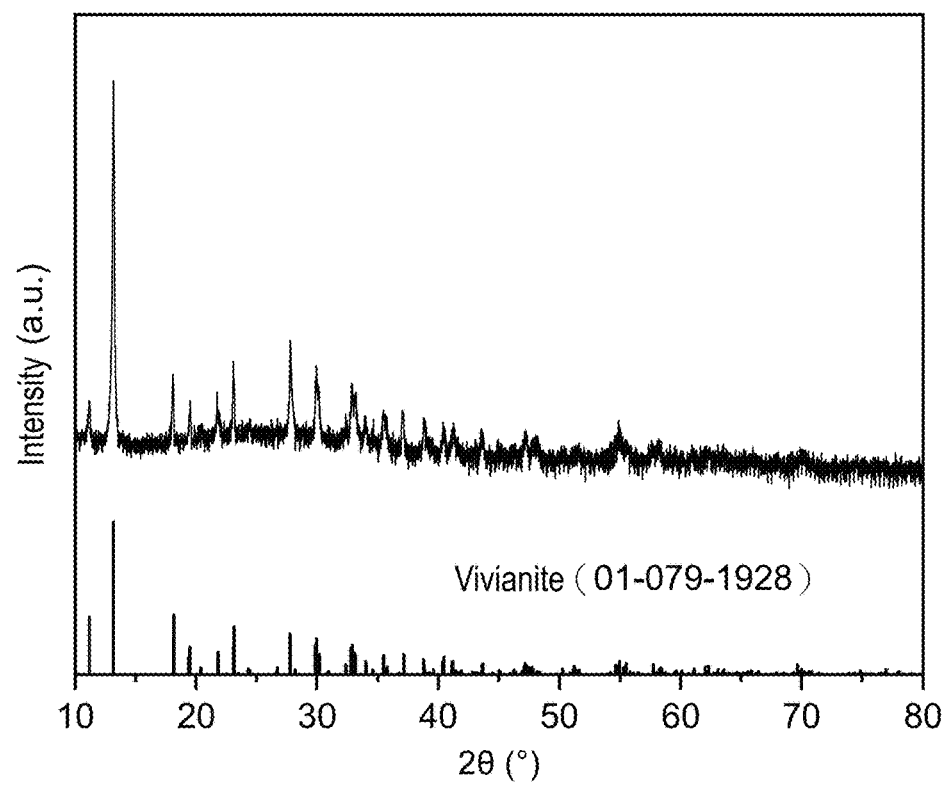
FIG. 3 is an XRD pattern of high-purity vivianite prepared by a method of recovering phosphorus in phosphogypsum leachate and synchronous performing brine desalination based on the flow electrode capacitive deionization system provided by Example 2 of the disclosure.

A flow electrode capacitive deionization system for recovering phosphorus in phosphogypsum leachate and synchronous performing brine desalination is adopted in this example. As shown in FIG. 2, the system is formed by a phosphorus recovery electrodeionization module, a desalination electrodeionization module, a phosphogypsum leachate reservoir 1, a brine reservoir 8, a first flow electrode solution reservoir 9, and a second flow electrode solution reservoir 10.

The phosphorus recovery electrodeionization module includes a phosphorus recovery electrodeionization module anode flow electrode chamber 3, a phosphorus recovery electrodeionization module cathode flow electrode chamber 7, and a phosphorus recovery electrodeionization module deionization chamber 5. The desalination electrodeionization module includes a desalination electrodeionization module anode flow electrode chamber 15, a desalination electrodeionization module cathode flow electrode chamber 11, and a desalination electrodeionization module deionization chamber 13.

A liquid outlet of the phosphogypsum leachate reservoir 1 communicates with a liquid inlet of the phosphorus recovery electrodeionization module deionization chamber 5. A liquid outlet of the phosphorus recovery electrodeionization module deionization chamber 5 communicates with a liquid inlet of the phosphogypsum leachate reservoir 1. A liquid outlet of the brine reservoir 8 communicates with a liquid inlet of the desalination electrodeionization module deionization chamber 13, so that the continuous treatment of brine inflow by the system is achieved.

A liquid outlet of the first flow electrode solution reservoir 9 communicates with a liquid inlet of the phosphorus recovery electrodeionization module anode flow electrode chamber 3. A liquid outlet of the phosphorus recovery electrodeionization module anode flow electrode chamber 3 communicates with a liquid inlet of the desalination electrodeionization module cathode flow electrode chamber 11. A liquid outlet of the desalination electrodeionization module cathode flow electrode chamber 11 communicates with a liquid inlet of the first flow electrode solution reservoir 9.

A liquid outlet of the second flow electrode solution reservoir 10 communicates with a liquid inlet of the phosphorus recovery electrodeionization module cathode flow electrode chamber 7. A liquid outlet of the phosphorus recovery electrodeionization module cathode flow electrode chamber 7 communicates with a liquid inlet of the desalination electrodeionization module anode flow electrode chamber 15. A liquid outlet of the desalination electrodeionization module anode flow electrode chamber 15 communicates with a liquid inlet of the second flow electrode solution reservoir 10.

Each of the phosphorus recovery electrodeionization module anode flow electrode chamber 3, the phosphorus recovery electrodeionization module cathode flow electrode chamber 7, the desalination electrodeionization module anode flow electrode chamber 15, and the desalination electrodeionization module cathode flow electrode chamber 11 includes a current collector plate 2 having a flow electrode solution flowing channel.

A first anion exchange membrane 4 is provided between the phosphorus recovery electrodeionization module anode flow electrode chamber 3 and the phosphorus recovery electrodeionization module deionization chamber 5. A first cation exchange membrane 6 is provided between the phosphorus recovery electrodeionization module cathode flow electrode chamber 7 and the phosphorus recovery electrodeionization module deionization chamber 5. Herein, in order to effectively remove the divalent cations in the phosphogypsum leachate, the first cation exchange membrane adopts a cation exchange membrane with good divalent cation selectivity.

A second anion exchange membrane 14 is provided between the desalination electrodeionization module anode flow electrode chamber 15 and the desalination electrodeionization module deionization chamber 13. A second cation exchange membrane 12 is provided between the desalination electrodeionization module cathode flow electrode chamber 11 and the desalination electrodeionization module deionization chamber 13.

Example 2

FIG. 1 is a flow chart of a process of recovering phosphorus in phosphogypsum leachate and synchronous performing brine desalination based on a flow electrode capacitive deionization system according to the disclosure. The flow electrode capacitive deionization system in Example 1 is adopted in this example to recover phosphorus in the phosphogypsum leachate and synchronous performing brine desalination. The specific process is provided as follows.

Suspended matters in the phosphogypsum leachate were removed by filtration operation. At a flow velocity of 10 mL/min, 100 mL of phosphogypsum leachate (total phosphorus: 3100 mg/L, $SO_4^{2-}$: 3800 mg/L, F: 1000 mg/L, $Ca^{2+}$: 900 mg/L, $Mg^{2+}$: 400 mg/L, and $Al^{3+}$: 500 mg/L) was then transported into the phosphorus recovery electrodeionization module deionization chamber 5 through a liquid pump and circulated between the phosphogypsum leachate reservoir 1 and the phosphorus recovery electrodeionization module deionization chamber 5. At a flow velocity of 10 mL/min, brine (with a NaCl content of 2000 mg/L) was transported to the desalination electrodeionization module deionization chamber 13 through the liquid pump. At a flow velocity of 20 mL/min, the flow electrode solution in the first flow electrode solution reservoir 9 was sequentially transported to the phosphorus recovery electrodeionization module anode flow electrode chamber 3 and the desalination electrodeionization module cathode flow electrode chamber 11 through the liquid pump and circulated between the above three chambers. At a flow velocity of 20 mL/min, the flow electrode solution in the second flow electrode solution reservoir 10 was sequentially transported to the phosphorus recovery electrodeionization module cathode flow electrode chamber 7 and the desalination electrodeionization module anode flow electrode chamber 15 through the liquid pump and circulated between the above three chambers. After the conductivity of the effluent from the desalination electrodeionization module was stable, the power supply was turned on, current densities of the phosphorus recovery electrodeionization module and the desalination electrodeionization module were controlled to be 20 $mA/m^2$, and the modules was operated continuously for 200 min.

The first flow electrode solution reservoir 9 and the second flow electrode solution reservoir 10 each contained 200 g of flow electrode solution, where the flow electrode solution was a suspension of activated carbon, conductive carbon black, and water. The content of activated carbon in the suspension was 9 wt %, and the content of conductive carbon black was 1 wt %.

After the operation and treatment were completed, the content of ions in the phosphogypsum leachate reservoir 1 was measured: total phosphorus: 77.5 mg/L, $SO_4^{2-}$: 68.4 mg/L, $F^-$: 226 mg/L, $Ca^{2+}$: 6.3 mg/L, $Mg^{2+}$: 6.8 mg/L, and $Al^{3+}$: 139.5 mg/L. The calculated removal ratio of each ion in the phosphogypsum leachate was: total phosphorus: 97.5%, $SO_4^{2-}$: 98.2%, $F^-$: 77.4%, $Ca^{2+}$: 99.3%, $Mg^{2+}$: 98.3%, and $Al^{3+}$: 72.1%. The stable salt concentration of the effluent from the desalination electrodeionization module was 1397 mg/L. Phosphorus-rich solution at pH=6.5 was obtained from the slurry in the first flow electrode solution reservoir 9 by filtration operation.

Ferrous sulfate solution with a concentration of 0.067 mol/L was transported to a reactor together with the phosphorus-rich solution according to the ratio of the total Fe/P molar ratio of 1.5 for crystallization reaction. 0.05 mol/L hydrochloric acid and 0.05 mol/L sodium hydroxide were used to control the pH of the solution to 7. After stirring and reacting for 0.5 h, the solution was left to stand for 2.5 h. After the precipitation was completed, the solid sample was obtained by filtration operation. The XRD pattern of the solid sample obtained through Example 2 is shown in FIG.

Figure 4:
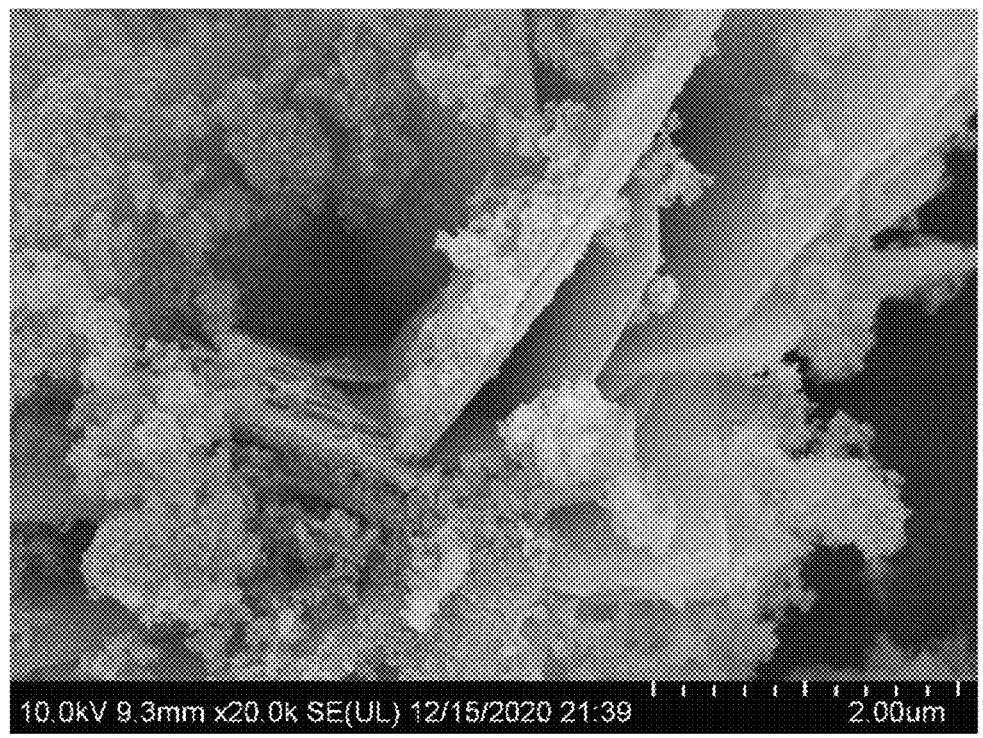
FIG. 4 is an SEM image of high-purity vivianite prepared by the method of recovering phosphorus in phosphogypsum leachate and synchronous performing brine desalination based on the flow electrode capacitive deionization system provided by Example 2 of the disclosure.

3, and all the characteristic diffraction peaks are consistent with high-purity vivianite. The SEM image of the solid sample is shown in FIG. 4, and the solid sample presents a petal shape, which is consistent with the surface morphology and structure of high-purity vivianite reported in the existing literature. According to the calculation of chemical purity, the purity of the obtained vivianite products reaches 98.6%.

Example 3

The flow electrode capacitive deionization system in Example 1 is adopted in this example to recover phosphorus in the phosphogypsum leachate and synchronous performing brine desalination. Compared to Example 2, the main differences are provided as follows. The inflow velocity of the phosphogypsum leachate in the phosphorus recovery electrodeionization module was 5 mL/min. The inflow velocity of the brine in the desalination electrodeionization module was 5 mL/min. The content of activated carbon in the flow electrode solution was 5 wt %, the content of conductive carbon black was 1 wt %, and the content of sodium chloride was 1 g/L. The circulation velocity of the flow electrode solution in the first flow electrode solution reservoir 9 and the second flow electrode solution reservoir 10 was 10 mL/min. The current densities of the phosphorus recovery electrodeionization module and the desalination electrodeionization module were controlled to be 10 mA/m$^2$, and the modules were operated continuously for 300 min.

After the operation and treatment were completed, the content of each ion in the phosphogypsum leachate reservoir 1 was measured: total phosphorus: 260.4 mg/L, $SO_4^{2-}$: 159.6 mg/L, F$^-$: 277 mg/L, Ca$^{2+}$: 58.5 mg/L, Mg$^{2+}$: 29.2 mg/L, and Al$^{3+}$: 174 mg/L. The calculated removal ratio of each ion in the phosphogypsum leachate was: total phosphorus: 91.6%, $SO_4^{2-}$: 95.8%, F$^-$: 72.3%, Ca$^{2+}$: 93.5%, Mg$^{2+}$: 92.7%, and Al$^{3+}$: 65.2%. The stable salt concentration of the effluent from the desalination electrodeionization module was 1542 mg/L. Phosphorus-rich solution at pH=6.5 was obtained from the slurry in the first flow electrode solution reservoir 9 by filtration operation.

The ferrous sulfate solution with a concentration of 0.067 mol/L was transported to a reactor together with the phosphorus-rich solution according to the ratio of the total Fe/P molar ratio of 1.65 for crystallization reaction. 0.05 mol/L hydrochloric acid and 0.05 mol/L sodium hydroxide were used to control the pH of the solution to 6.5. After stirring and reacting for 0.5 h, the solution was left to stand for 2 h. After the precipitation was completed, the solid sample was obtained by filtration operation. The obtained solid sample was characterized by XRD as high-purity vivianite, with a purity of 97.4%.

Example 4

The flow electrode capacitive deionization system in Example 1 is adopted in this example to recover phosphorus in the phosphogypsum leachate and synchronous performing brine desalination. Compared to Example 2, the main differences are provided as follows. The inflow velocity of the phosphogypsum leachate in the phosphorus recovery electrodeionization module was 20 mL/min. The inflow velocity of the brine in the desalination electrodeionization module was 20 mL/min. The content of activated carbon in the flow electrode solution was 9 wt %, the content of conductive carbon black was 1 wt %, and the content of sodium chloride was 2 g/L. The circulation velocity of flow electrode solution in the first flow electrode solution reservoir 9 and the second flow electrode solution reservoir 10 was 20 mL/min. The current densities of the phosphorus recovery electrodeionization module and the desalination electrodeionization module were controlled to be 30 mA/m$^2$, and the modules were operated continuously for 150 min.

After the operation and treatment were completed, the content of each ion in the phosphogypsum leachate reservoir 1 was measured: total phosphorus: 15.5 mg/L, $SO_4^{2-}$: 49.4 mg/L, F$^-$: 118 mg/L, Ca$^{2+}$: 2.7 mg/L, Mg$^{2+}$: 5.2 mg/L, and Al$^{3+}$: 62.5 mg/L. The calculated removal ratio of each ion in the phosphogypsum leachate was: total phosphorus: 99.5%, $SO_4^{2-}$: 98.7%, F$^-$: 88.2%, Ca$^{2+}$: 99.7%, Mg$^{2+}$: 98.7%, and Al$^{3+}$: 87.5%. The stable salt concentration of the effluent from the desalination electrodeionization module was 873 mg/L. Phosphorus-rich solution at pH=7.4 was obtained from the slurry in the first flow electrode solution reservoir 9 by filtration operation.

The ferrous sulfate solution with a concentration of 0.067 mol/L was transported to a reactor together with the phosphorus-rich solution according to the ratio of the total Fe/P molar ratio of 1.6 for crystallization reaction. 0.05 mol/L hydrochloric acid and 0.05 mol/L sodium hydroxide were used to control the pH of the solution to 7.5. After stirring and reacting for 1 h, the solution was left to stand for 4 h. After the precipitation was completed, the solid sample was obtained by filtration. The purity of the obtained vivianite products reached 98.3%.

In view of the foregoing, the disclosure provides a flow electrode capacitive deionization system and method for recovering phosphorus in phosphogypsum leachate and synchronous performing brine desalination. By adopting the flow electrode capacitive deionization system and the corresponding operation method, the selective separation of phosphorus in the phosphogypsum leachate and the rapid desalination of brine can be simultaneously and efficiently achieved. The use of chemical reagents such as acid and alkali reagents is thereby significantly reduced, the recycling costs are lowered, the generation of waste residues is decreased, and the energy consumption is low. Further, high-purity and high-value phosphorus recovery products are obtained. The disclosure has important significance for achieving resourceful treatment of phosphogypsum leachate in an environment-friendly and efficient manner.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A flow electrode capacitive deionization system for recovering phosphorus in phosphogypsum leachate and synchronously performing brine desalination, wherein the flow electrode capacitive deionization system comprises a phosphorus recovery electrodeionization module and a desalination electrodeionization module, the phosphorus recovery electrodeionization module comprises a phosphorus recovery electrodeionization module anode flow electrode chamber (3), a phosphorus recovery electrodeionization module cathode flow electrode chamber (7), and a phosphorus recovery electrodeionization module deionization chamber (5), a first anion exchange membrane (4) is provided between the phosphorus recovery electrodeionization module anode flow electrode chamber (3) and the phosphorus recovery electrodeionization module deionization chamber (5), and a first cation exchange membrane (6) is provided between the phosphorus recovery electrodeionization module cathode flow electrode chamber (7) and the phosphorus recovery electrodeionization module deionization chamber (5), the desalination electrodeionization module comprises a desalination electrodeionization module anode flow electrode chamber (15), a desalination electrodeionization module cathode flow electrode chamber (11), and a desalination electrodeionization module deionization chamber (13), a second cation exchange membrane (12) is provided between the desalination electrodeionization module cathode flow electrode chamber (11) and the desalination electrodeionization module deionization chamber (13), and a second anion exchange membrane (14) is provided between the desalination electrodeionization module anode flow electrode chamber (15) and the desalination electrodeionization module deionization chamber (13), the flow electrode capacitive deionization system further comprises a phosphogypsum leachate reservoir (1), a brine reservoir (8), a first flow electrode solution reservoir (9), and a second flow electrode solution reservoir (10), a liquid outlet of the phosphogypsum leachate reservoir (1) communicates with a liquid inlet of the phosphorus recovery electrodeionization module deionization chamber (5), a liquid outlet of the phosphorus recovery electrodeionization module deionization chamber (5) communicates with a liquid inlet of the phosphogypsum leachate reservoir (1), and a liquid outlet of the brine reservoir (8) communicates with a liquid inlet of the desalination electrodeionization module deionization chamber (13), a liquid outlet of the first flow electrode solution reservoir (9) communicates with a liquid inlet of the phosphorus recovery electrodeionization module anode flow electrode chamber (3), a liquid outlet of the phosphorus recovery electrodeionization module anode flow electrode chamber (3) communicates with a liquid inlet of the desalination electrodeionization module cathode flow electrode chamber (11), and a liquid outlet of the desalination electrodeionization module cathode flow electrode chamber (11) communicates with a liquid inlet of the first flow electrode solution reservoir (9), a liquid outlet of the second flow electrode solution reservoir (10) communicates with a liquid inlet of the phosphorus recovery electrodeionization module cathode flow electrode chamber (7), a liquid outlet of the phosphorus recovery electrodeionization module cathode flow electrode chamber (7) communicates with a liquid inlet of the desalination electrodeionization module anode flow electrode chamber (15), and a liquid outlet of the desalination electrodeionization module anode flow electrode chamber (15) communicates with a liquid inlet of the second flow electrode solution reservoir (10), and each of the phosphorus recovery electrodeionization module anode flow electrode chamber (3), the phosphorus recovery electrodeionization module cathode flow electrode chamber (7), the desalination electrodeionization module anode flow electrode chamber (15), and the desalination electrodeionization module cathode flow electrode chamber (11) comprises a current collector plate (2) having a flow electrode solution flowing channel.

2. The flow electrode capacitive deionization system for recovering phosphorus in phosphogypsum leachate and synchronously performing brine desalination according to claim 1, wherein a liquid outlet of the desalination electrodeionization module deionization chamber (13) communicates with a liquid inlet of the brine reservoir (8).

3. A method for recovering phosphorus in phosphogypsum leachate and synchronously performing brine desalination in the flow electrode capacitive deionization system according to claim 1, wherein the method comprises following steps:

S1: transporting a phosphogypsum leachate and a brine respectively from the phosphogypsum leachate reservoir (1) and the brine reservoir (8) to the phosphorus recovery electrodeionization module deionization chamber (5) and the desalination electrodeionization module deionization chamber (13) in the flow electrode capacitive deionization system through a liquid pump;

transporting a first flow electrode solution through a first flow electrode circulation loop comprising the first flow electrode solution reservoir (9), the phosphorus recovery electrodeionization module anode flow electrode chamber (3), the desalination electrodeionization module cathode flow electrode chamber (11), and the first flow electrode solution reservoir (9);

transporting a second flow electrode solution through a second flow electrode circulation loop comprising the second flow electrode solution reservoir (10), the phosphorus recovery electrodeionization module cathode flow electrode chamber (7), the desalination electrodeionization module anode flow electrode chamber (15), and the second flow electrode solution reservoir (10), wherein a liquid inflow mode of the phosphogypsum leachate is batch-mode, wherein the batch-mode is that the phosphogypsum leachate is transported from the phosphogypsum leachate reservoir (1) to the phosphorus recovery electrodeionization module deionization chamber (5) through the liquid pump and returns to the phosphogypsum leachate reservoir (1) after deionization treatment, and wherein the phosphogypsum leachate enters the phosphorus recovery electrodeionization module (5), phosphate migrates to the phosphorus recovery electrodeionization module anode flow electrode chamber (3), follows the flow electrode to the desalination electrodeionization module cathode flow electrode chamber (11), and is desorbed and enriched into the flow electrode solution by a reverse voltage, a liquid inflow mode of the brine is single-pass, wherein the single-pass is that the brine is transported from the brine reservoir (8) to the desalination electrodeionization module deionization chamber (13) through the liquid pump and is transported out of the flow electrode capacitive deionization system after deionization treatment;

S2: operating the phosphorus recovery electrodeionization module and the desalination electrodeionization module at a same current and controlling an inflow velocity of the phosphogypsum leachate, an inflow velocity of the brine, and a circulation velocity of the flow electrode solution; and S3: obtaining a purified phosphorus-rich solution from the first flow electrode solution reservoir (9).

4. The method according to claim 3, wherein in step S1, the phosphogypsum leachate is a purified solution after filtration or sedimentation, wherein a total suspended solids does not exceed 0.5 mg/L, a total content of calcium element and magnesium element does not exceed 2000 mg/L, a content of aluminum element does not exceed 600 mg/L, a content of fluorine element does not exceed 1500 mg/L, and a content of phosphorus element does not exceed 6000 mg/L in the phosphogypsum leachate.

5. The method according to claim 3, wherein in step S1, the brine is a softened solution, a salt content of the brine does not exceed 10 g/L, a total hardness does not exceed 3 mg/L, the total hardness is calculated as $CaCO_3$, and a total suspended solids does not exceed 0.5 mg/L.

6. The method according to claim 3, wherein in step S1, the flow electrode solution contains a conductive agent, an electrolyte, and a solvent, wherein a content of the conductive agent is 5 wt % to 10 wt %, and a concentration of the electrolyte in the flow electrode solution is 0 g/L to 2 g/L; and the conductive agent in the flow electrode solution is one or more of: activated carbon, conductive carbon black, and carbon nanotubes;

the electrolyte in the flow electrode solution is one or more of: sodium chloride, sodium sulfate, potassium chloride, and potassium sulfate; and the solvent in the flow electrode solution is water.

7. The method according to claim 3, wherein a working current density of the phosphorus recovery electrodeionization module and the desalination electrodeionization module is 10 $A/m^2$ to 30 $A/m^2$.

8. The method according to claim 3, wherein, an inflow velocity of the phosphogypsum leachate is 5 mL/min to 20 mL/min, a total circulation volume is 10 times to 30 times of a treatment volume in the phosphogypsum leachate reservoir, and an inflow velocity of the brine is 5 mL/min to 20 mL/min.

9. The method according to claim 3, wherein the circulation velocity of the flow electrode solution is 10 mL/min to 20 mL/min, the first flow electrode solution volume in the first flow electrode solution reservoir (9) and the second flow electrode solution volume in the second flow electrode solution reservoir (10) are 0.5 times to 2 times of a treatment volume in the phosphogypsum leachate reservoir (1).

10. The method according to claim 3, wherein the obtained phosphorus-rich solution is reacted with a ferrous solution under an oxygen-free condition to generate vivianite, so phosphorus recovery is achieved, a mole ratio of iron element in the ferrous solution to phosphorus element in the phosphorus-rich solution is 1.5 to 1.65, during the reaction a reaction pH is maintained at 6 to 7.5, and the ferrous solution is ferrous chloride or ferrous sulfate.

* * * * *